March 21, 1961 H. F. MARTIN 2,975,967

PHOTO-SENSING MECHANISM AND CIRCUIT FOR PUNCHED DATA CARDS

Filed June 1, 1959

INVENTOR.
HAROLD F. MARTIN
BY Hansen and Lane
ATTORNEYS 2,975,967
Patented Mar. 21, 1961

2,975,967

PHOTO-SENSING MECHANISM AND CIRCUIT FOR PUNCHED DATA CARDS

Harold F. Martin, San Jose, Calif., assignor to International Business Machines Corporation, New York, N.Y., a corporation of New York Filed June 1, 1959, Ser. No. 817,298

6 Claims. (Cl. 235—61.11)

The present invention relates to the reading of punched data cards, and pertains more particularly to the photo-sensing of punched cards by the use of a monitored pulse applied to small neon bulbs adapted to be individually illuminated by light beams passing through punched holes in the cards.

In some data processing and calculating mechanisms data is recorded on, and supplied to, the mechanisms by means of well known columnar punched cards, wherein the presence or absence of a punched hole in each of a plurality of punch zones in each of a plurality of columns on the card has a specific numerical or other significance.

In the past, various well known methods and mechanisms have been employed for the purpose of "reading" the data from these punched cards, and suitable mechanisms for the timed feeding of these cards through a sensing or reading mechanism are well known.

The present invention provides for the reading of punched cards by a plurality of small neon bulbs positioned to receive light beams passing through punched openings in a data card, and connected into a monitored circuit for firing only the bulbs receiving such light beams.

A further object of the invention is to provide a photo-sensing unit for reading punched cards wherein a plurality of neon tubes are mounted in a light shielded zone for individual exposure to light beams passing through any punched holes in a selected zone of such cards, and are connected into a circuit for receiving a firing pulse, a monitor tube being connected into the firing circuit and subjected to a source of light so as to fire and terminate such firing pulse upon the firing of the neon bulbs receiving such light beams, but prior to the firing of any of the bulbs not receiving such light beams.

The invention also provides an improved mechanism and method for the photo-sensing of punched openings in a data processing card.

These, and other objects and advantages of the invention will be apparent from the following description and the accompanying drawings, wherein.

Figure 1:
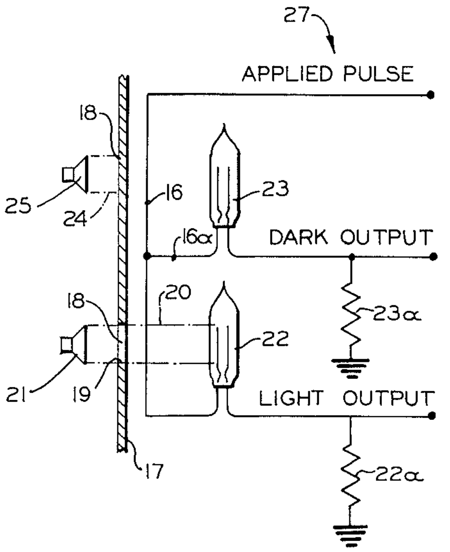
Fig. 1 is a schematic drawing showing a firing circuit for illuminated and non-illuminated neon bulbs.

Briefly, the invention provides a mechanism A (Fig. 2) for photo-sensing punched data bearing cards B (Fig. 2) wherein a plurality of neon reading bulbs C are positioned to be individually illuminated by light beams 10 passing through any holes 11 punched in data zones 12 of the punched card B.

The reading bulbs C are subjected to a monitored firing pulse indicated by the graph line 13 (Fig. 2A) of sufficient intensity and duration to fire any illuminated reading bulbs such as the bulb C*a*, but not the non-illuminated ones C*b*. The firing pulse 13 is monitored by an illuminated neon control bulb 14 connected, upon the firing thereof, to overcome a negative bias on the control grid of a thyratron tube 15 and thereby to allow a shorting current applied to the cathode of a conventional thyratron tube 15 to flow through the thyratron tube and short out the firing pulse 13 applied to the reading bulbs C before the non-illuminated reading bulbs C*b* can fire.

Figure 1A:
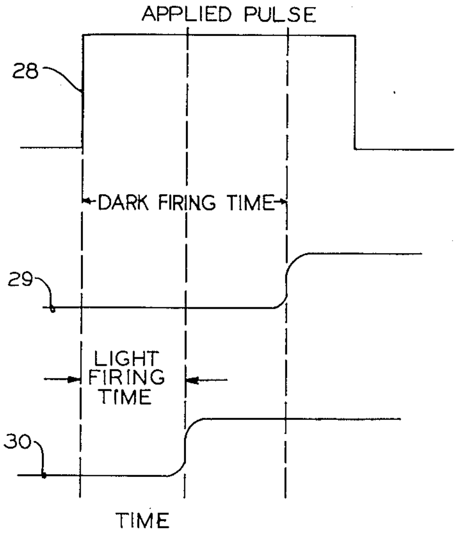
Fig. 1A is a graph showing the relative firing times of the illuminated and non-illuminated neon bulbs of Fig. 1 when subjected to a firing pulse.

Figs. 1 and 1A illustrate the relative firing times of illuminated and non-illuminated neon tubes. Fig. 1 shows a data card 17 having data zones 18 therein, one of which zones has a hole 19 punched therein. A light beam 20 from a light source 21, passing through the punched hole 19, illuminates a neon bulb 22 mounted to register with such hole. A second neon bulb 23, mounted to register with the unpunched punch zone 18, is shielded by the card 17 from a light beam 24 from a light source 25.

A pulse receiving circuit 27 is adapted to impose a firing pulse indicated by the graph line 28 (Fig. 1A) through a conductor 16 (Fig. 1) from a suitable pulse generator (not shown). Since such pulse generators are well known no drawings or descriptions thereof are provided herein. The pulse is transmitted through the conductors 16 and **16*a* to the bulbs 22 and 23, which are grounded through resistance elements 22*a* and 23*a*, respectively. This pulse 28 is of sufficient intensity and duration to fire both the illuminated bulb 22 and the non-illuminated bulb 23. It will be noted, however, that the firing time of the non-illuminated bulb 23 after the initiation of the pulse 28, and as indicated by the middle transverse line 29 of the graph of Fig. 1A, is longer than that of the illuminated bulb 22, indicated by the lowermost line 30** of Fig. 1A.

Suitable mechanisms for the timed manipulation of punched cards are well known to those familiar with the art, and since such mechanisms form no part of the present invention, they are not illustrated or described herein. It is not necessary that the cards be stationary for reading by means of the present invention, since the firing time of the illuminated reading bulbs is of the order of 35 to 70 micro-seconds for a hundred volts applied pulse, using a neon bulb such as an NE–2A, while the time for a punch zone to pass the reading zone is much greater, even when the cards are moving quite rapidly. Once a reading bulb has fired, the resulting ion cascade within the bulb forms many free ions in the gas, and sufficient time must be allowed for these free ions to recombine before the bulb is useful for firing again. For this reason an interpulse time of 2 to 3 milli-seconds is recommended between pulse repetitions.

In general, the firing times of the neon bulbs is influenced by the following factors:

(1) The composition of the cathode material of the neon bulbs.

(2) The cathode area of such bulbs which takes part in the reaction.

(3) The applied voltage across the bulbs.

(4) The intensity of illumination to which the bulb is subjected at the time of receiving the firing pulse.

(5) Control of negative bias applied to the bulbs.

It is desirable therefore that the first four of these features of the reading bulbs be as uniform as is practical, while the duration of the monitoring pulse may be controlled by the fifth of said features.

The timing of the applied pulse 31 (Fig. 2) to coincide with the location of the data zones 12 of a card B to be read in register with their respective light beams 10 and reading bulbs C is done by normal circuit breakers (not shown) which are timed with conventional and well known card feeding mechanism (also not shown) as will be obvious to those familiar with the art.

Figures 2, 2A:
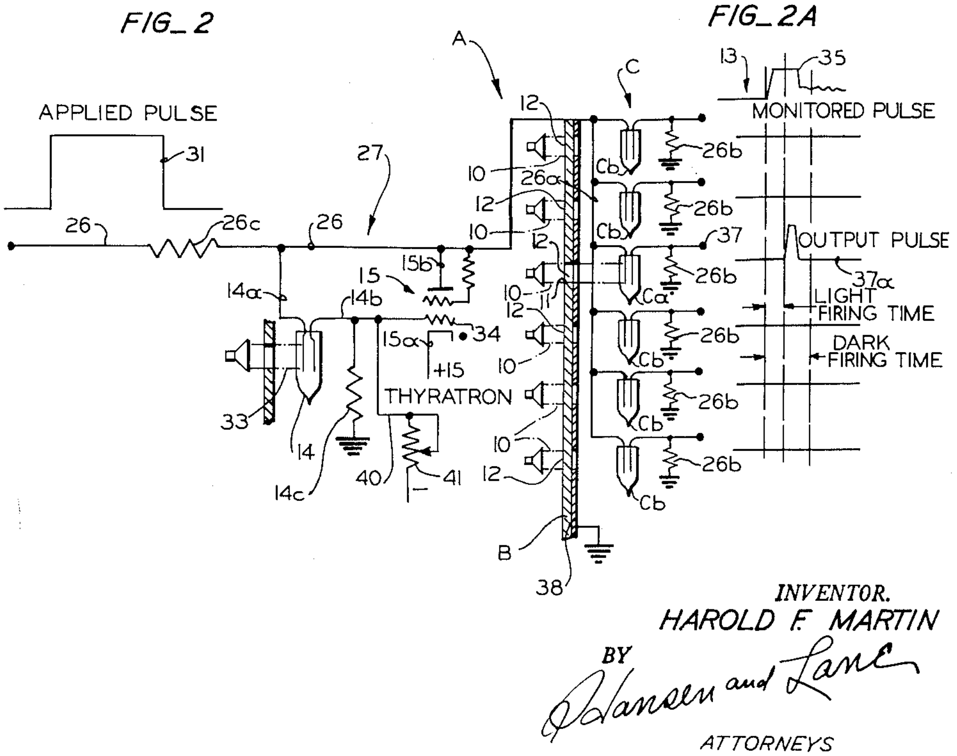
Fig. 2 is a schematic drawing of a circuit of the same general nature as that shown in Fig. 1, but showing a monitoring bulb circuit added thereto in accordance with the present invention, an applied electrical pulse being indicated graphically.
Fig. 2A is a graph showing the monitored firing pulse produced by the monitored circuit of Fig. 2, and the firing effect on the single illuminated neon reading bulb of Fig. 2, which bulb is illuminated by a light beam passing through a punched opening in the card.

Referring in further detail to the embodiment of the invention shown in Fig. 2, a plurality of small neon reading bulbs C are mounted one opposite each of a plurality of data zones 12 of a data punched card B positioned by conventional card handling means for reading, and are connected into the circuit 27 to receive a monitored electrical firing pulse, indicated by the graph line 13 of Fig. 2A through the conductors 26 and **26*a*. Each of the bulb C is grounded through a resistance element 26*b***.

In order to provide the monitored pulse 13, an unmonitored positive pulse indicated by the graph line 31 of Fig. 2, is applied to the circuit 32 through the conductor 26 and suitable resistance element **26*c*. The pulse 31 as applied to the input conductor 26 of the circuit 27 is of sufficient duration and intensity that, unless interrupted, it would fire all of the reading bulbs C whether the latter were illuminated or not. In order to insure termination of the firing pulse 13** applied to the reading bulbs C prior to the firing of the non-illuminated bulbs C*b* however, the neon monitor bulb 14, which may be similar to the reading bulbs C, is mounted for illumination by a light beam 33 corresponding to the light beams 10 directed toward the data zones 12. This monitor bulb 14 is connected into the circuit 32 by a conductor **14*a* to receive the applied pulse 31, and is also connected to the control grid 34 of the conventional thyratron tube 15 by a conductor 14*b*. Conductor 14*b* is grounded through a resistance element 14*c*, and is also subjected to an adjusted negative bias by a conductor 40 and a variable resistor 41. The adjusted negative bias thus applied to the control grid 34 of the thyratron tube 15 prevents a current carrying ion cascade therethrough until such negative bias is overcome by the firing of the control tube 14. Also, adjustment of this negative bias may be used to control the firing time of the neon control bulb 14 to insure the firing of all illuminated reading tubes C prior to the shorting out of the firing pulse 13 at point 35 (Fig. 2A) upon the firing of the control bulb 14**.

The cascade of ions within the control bulb 14 produced by the firing of said bulb transmits a positive pulse to the control grid 34 and thus overcomes the negative bias on said control grid, which permits a flow of current through conductor **15*a*, the thyratron tube 15, and conductor 15*b*. This current flow is of sufficient duration to short out the firing pulse 13 as indicated graphically at 35** (Fig. 2A) after the illuminated reading bulbs C*a* have fired, but before the non-illuminated reading bulbs C*b* can fire. Thus, only the illuminated ones C*a* of the reading bulbs C will be fired to thereby produce an output or reading pulse indicated by the graph line **37*a* (Fig. 2A) at the output terminal 37** (Fig. 2) of each illuminated reading bulb.

It has been found that the firing times of the reading bulbs C are somewhat influence by the presence of electric fields, and particularly by the static electricity present on the card as it moves in a usual manner through a reading machine (not shown) in which the present invention is embodied. For this reason it is preferred to shield the bulbs from such fields with a grounded conductor, such as, for example, the grounded sheet metal shield 38 in Fig. 2. Also, since the accumulation of card dust tends to obstruct the punched openings in the cards, and thus to reduce the intensity of illumination of a neon reading bulb C by a light beam 10 passing through such punched opening, it is advisable to keep the cards and the machine, including the neon bulbs C and 14 as free from such card dust as is practicable.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim:

1. A photo-sensing unit for reading a punched data processing card having a plurality of punch zones therein, comprising a plurality of small neon reading bulbs mounted to register one with each of such punch zones with such card in a selected position, lighting means mounted to direct a beam of light at each of such punch zones and through a punched hole in any of such punch zones, thereby to illuminate the neon bulb in register with each punch zone having such hole punched therein, the remainder of said bulbs being shielded by such card from the lighting means, circuit means for subjecting all of said bulbs to an electrical pulse of firing intensity, and light controlled means for limiting the duration of such pulse to a length of time sufficient to fire the illuminated ones of said reading bulbs, and insufficient to fire the non-illuminated ones of said reading bulbs.

2. A unit according to claim 1 wherein an electrically conductive plate is mounted to have substantially overall contact with such card in said selected position thereof, and conductor means are connected from said plate to ground for removing static electrical charges from such card.

3. A unit according to claim 1 wherein the pulse limiting means comprises a thyratron tube triggered by an illuminated neon control bulb and connected into the circuit means to short out such pulse upon the firing of the illuminated neon control bulb.

4. A photo-sensing unit for reading a punched data processing card having a plurality of punch zones therein, comprising a plurality of small neon reading bulbs mounted to register one with each of the punch zones with such card in a selected position, lighting means mounted to direct a beam of light at each such punch zone and through punched holes in any of such punch zones, thereby to illuminate the neon reading bulb in register with each zone having a punched hole therein, the remainder of the reading bulbs being shielded by such card from the lighting means, circuit means adapted to receive an electrical pulse of firing intensity for subjecting all of said reading bulbs to such pulse, pulse control means comprising a neon control bulb having firing characteristics similar to the reading bulbs and connected into the circuit similarly to the reading bulbs, light means illuminating the control bulb, and pulse terminating means connected through the illuminated control bulb for triggering by an ion cascade produced by the firing of the control bulb, whereby a pulse of bulb firing intensity transmitted to said circuit is terminated after a duration sufficient to fire the illuminated ones of said bulbs, but insufficient to fire the non-illuminated ones of said bulbs.

5. A unit according to claim 4 wherein the control bulb is connected to overcome a flow-restricting bias on the control grid of a thyratron tube, the latter being connected into said circuit and subjected to a current for shorting out such pulse, said thyratron tube in the unfired state of the illuminated neon control bulb barring the passage of the shorting current, and transmitting the shorting current to short out the pulse when the restricting bias on the control grid of the thyratron tube is overcome by the firing of the neon control bulb.

6. A photo-sensing unit for reading a punched data processing card comprising a plurality of small neon reading bulbs positioned to receive individual light beams passing through punched openings in such card, said reading bulbs being connected into a circuit adapted to receive a firing pulse for firing said reading bulbs, and control means including an illuminated neon control bulb connected into said circuit to receive such firing pulse and for terminating such firing pulse upon the firing of the control bulb, whereby any illuminated reading bulbs will be fired by such pulse, and any non-illuminated reading bulbs will remain unfired by such pulse.

No references cited.